Reissued Mar. 28, 1950

Re. 23,212

UNITED STATES PATENT OFFICE 23,212

FLEXIBLE MATERIAL WITH WRINKLE TEXTURED COATING

Nathan T. Beynon, Cleveland, Ohio, assignor to New Wrinkle, Inc., Dayton, Ohio, a corporation of Delaware No Drawing. Original No. 2,456,671, dated December 21, 1948, Serial No. 652,819, March 7, 1946. Application for reissue April 21, 1949, Serial No. 88,918

16 Claims. (Cl. 117—161)

Matter enclosed in heavy brackets [ ] appears in the original patent but forms no part of this reissue specification; matter printed in italics indicates the additions made by reissue This invention relates to wrinkle coated flexible materials and the method of making them.

Hitherto wrinkle drying coating compositions have been of two types: varnish type and alkyd type.

Varnish type wrinkle drying coating compositions consist essentially of a varnish base including a wrinkling oil in admixture with drier and solvent; while alkyd base wrinkle drying coating compositions consist essentially of an alkyd resin in admixture with drier and a solvent.

The production of both varnish base and alkyd base wrinkle drying coating compositions requires the use of cooking facilities.

The purpose of the present invention is to produce a new type of wrinkle drying coating composition wherein the cooking step is completely dispensed with and to utilize such compositions for the manufacture of wrinkle coated flexible materials. In other words, the coating compositions which are to be used according to the present invention are prepared by compounding the component parts thereof without the necessity of cooking.

For this purpose a wrinkling oil (that is to say, an oil which includes conjugated double bonds in its chemical structure) is admixed with an aqueous dispersion of a synthetic rubber latex in a ratio of from 10 parts to 50 parts of synthetic rubber latex to 100 parts of wrinkling oil.

To the resulting mixture may be added, if so desired, from 40 to 80 per cent of a pigment paste comprising for example, two-thirds pigment and one-third wrinkling oil by weight. This pigment paste is thoroughly blended into the mixture of synthetic rubber latex and wrinkling oil to produce a homogeneous composition.

To this homogeneous composition is added a quantity of solvent such as naphtha, toluol, xylol, or mixtures thereof, or any other solvent such as customarily employed in varnish formulations, in quantity sufficient to produce a coating of the desired viscosity.

For example, a coating of suitable viscosity for application by spreading may consist of 40 parts by weight of synthetic rubber latex, 100 parts by weight of wrinkling oil, 60 parts by weight of pigment paste, and 10 parts by weight of naphtha.

The use of synthetic rubber latices in admixture with wrinkling oils for producing wrinkle drying coating composition is new in the art; in fact, it has been hitherto considered impossible to use synthetic rubber latices in wrinkle drying coating compositions of any sort because the latex acted as an inhibitor of wrinkle formation.

The texture of the wrinkle pattern obtained according to the present invention may be controlled or altered by selection of the type of synthetic rubber latex used. In addition, wrinkle patterns or textures hitherto unobtainable may be produced varying the amount of synthetic rubber latex employed in the formulation.

In addition, this new type of wrinkle drying coating composition including synthetic rubber latex responds to temperature variation during the initial drying or texturing period to such an extent that a great variety of textures or patterns may be obtained.

It is believed that the underlying theory governing the production of wrinkle drying coating composition including synthetic rubber latices is as follows:

The mixture of synthetic rubber latex and wrinkling oil consists of two components which are compatible with each other; however, during the drying or film-forming period these ingredients separate into distinct phases, and thereby the texture of the wrinkle pattern is altered depending on the relative proportion or ratio of the two component parts. It will be understood, of course, that this theory is offered merely in explanation of observed facts, and that it is not intended thereby to limit this invention.

The following synthetic rubber latices have been used successfully in the practice of this invention:

Butadiene-styrene copolymer latex, 56% solids
Butadiene-acrylonitrile copolymer latex, 51.6% solids
Neoprene latex, 50% solids
Polyvinyl chloride latex, 65% solids Any of these synthetic rubber latices may be employed successfully in ratios of from 10 parts to 50 parts of latex to each 100 parts of wrinkling oil, and has been so employed in the practice of this invention.

As has been noted hereinbefore, wrinkling oils are oils which include conjugated double bonds in their chemical structure. They may be native oils such as tung oil and oiticica oil, or they may be modified oils such as dehydrated castor oil (either blown or unblown), blown linseed oil and alkali isomerized oils prepared from normally non-drying oils such as peanut oil and cottonseed oil, or they may be any other type of unsaturated fatty oil.

It has been found that wrinkle drying compositions made according to the method described above are qualified par excellence for the manufacture of wrinkle coated flexible materials. Thus, paper, fabrics, leather, cork, and other similar flexible materials may be successfully coated with these uncooked rubber latex-wrinkling oil mixtures, and materials are obtained thereby in which the flexibility has been retained completely or to an unusually high degree.

The compositions may be applied by spraying, spreading and rolling. The resulting film is then dried in an oven or other drying equipment known to those skilled in the art. An initial drying step at 130° F. for 30 minutes and subsequent drying at 180° F. for a period of from 30 to 60 minutes, for example, has been found to give very satisfactory results.

The rubber latex-wrinkling oil coating composition may be applied immediately to the flexible base material. However, intermediary, so-called base coats known to the art, either in one single layer or in multiple layers, may be applied prior to using the wrinkle coating proper.

The method of making the coating composition forms the subject matter of my co-pending application, Serial No. 598,646, filed June 9, 1945, *now abandoned.*

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

I claim:

1. The method of manufacturing flexible wrinkle-coated materials comprising the steps of mixing at room temperature 100 parts by weight of unsaturated fatty oil with varnish solvent and from 10 to 50 parts by weight of aqueous rubber latex, said rubber being selected from the group consisting of butadiene styrene copolymer, butadiene acrylic nitrile copolymer, and [neoprene] *polychloroprene*; applying the mixture thus obtained to a base material; and subjecting the coated material to drying, at substantially 130° F. for approximately 30 minutes and then at substantially 180° F. for a period of from about 30 to 60 minutes.

2. The method of manufacturing flexible, wrinkle-coated materials comprising the steps of mixing at room temperature 100 parts by weight of unsaturated fatty oil with varnish solvent and from 10 to 50 parts by weight of aqueous synthetic rubber latex, said rubber being selected from the group consisting of butadiene styrene copolymer, butadiene acrylic nitrile copolymer, and [neoprene] *polychloroprene*; admixing pigment paste to the mixture; applying the mixture thus obtained to a base material; and subjecting the coated material to drying at substantially 130° F. for approximately 30 minutes and then at substantially 180° F. for a period of from about 30 to 60 minutes.

3. The method of manufacturing flexible, wrinkle-coated materials comprising the steps of mixing at room temperature 100 parts by weight of unsaturated fatty oil with varnish solvent and from 10 to 50 parts by weight of aqueous synthetic rubber latex, said rubber being selected from the group consisting of butadiene styrene copolymer, butadiene acrylic nitrile copolymer, and [neoprene] *polychloroprene*; admixing pigment paste to the mixture, said pigment paste comprising two-thirds by weight of pigment and one-third by weight of unsaturated fatty oil, applying the mixture thus obtained to a base material; and subjecting the coated material to drying at substantially 130° F. for approximately 30 minutes and then at substantially 180° F. for a period of from about 30 to 60 minutes.

4. The method of manufacturing flexible, wrinkle-coated materials comprising the steps of mixing at room temperature 100 parts by weight of unsaturated fatty oil with varnish solvent and from 10 to 50 parts by weight of aqueous synthetic rubber latex, said rubber being selected from the group consisting of butadiene styrene copolymer, butadiene acrylic nitrile copolymer, and [neoprene] *polychloroprene*; admixing 40 to 80 parts by weight of pigment paste to the mixture; applying the mixture thus obtained to a base material; and subjecting the coated material to drying at substantially 130° F. for approximately 30 minutes and then at substantially 180° F. for a period of from about 30 to 60 minutes.

5. The method of manufacturing flexible, wrinkle-coated materials comprising the steps of mixing at room temperature 100 parts by weight of unsaturated fatty oil with varnish solvent and from 10 to 50 parts by weight of aqueous synthetic rubber latex, said rubber being selected from the group consisting of butadiene styrene copolymer, butadiene acrylic nitrile copolymer, and [neoprene] *polychloroprene*; applying the mixture thus obtained to a base material; and subjecting the coated material to drying at substantially 130° F. for approximately 30 minutes and then at substantially 180° F. for a period of from about 30 to 60 minutes.

6. The method of manufacturing flexible, wrinkle-coated materials comprising the steps of mixing at room temperature 100 parts by weight of unsaturated fatty oil with varnish solvent and from 10 to 50 parts by weight of aqueous butadiene styrene-copolymer latex; applying the mixture thus obtained to a base material; and subjecting the coated material to drying at substantially 130° F. for approximately 30 minutes and then at substantially 180° F. for a period of from about 30 to 60 minutes.

7. The method of manufacturing flexible, wrinkle-coated materials comprising the steps of mixing at room temperature 100 parts by weight of unsaturated fatty oil with varnish solvent and from 10 to 50 parts by weight of aqueous butadiene acrylic nitrile copolymer latex; applying the mixture thus obtained to a base material; and subjecting the coated material to drying at substantially 130° F. for approximately 30 minutes and then at substantially 180° F. for a period of from about 30 to 60 minutes.

8. The method of manufacturing flexible, wrinkle-coated materials comprising the steps of mixing at room temperature 100 parts by weight of unsaturated fatty oil with varnish solvent and from 10 to 50 parts by weight of aqueous [neoprene] *polychloroprene* latex; applying the mixture thus obtained to a base material; and subjecting the coated material to drying at substantially 130° F. for approximately 30 minutes and then at substantially 180° F. for a period of from about 30 to 60 minutes.

9. *As a new composition of matter, a wrinkle drying coating composition comprising conju-*

*gated double bonded oil and butadiene-styrene copolymer rubber latex in proportions of 100 parts by weight of said oil to from 10 to 50 parts by weight of latex, said latex having a solids content of 56 per cent.*

*10. As a new composition of matter, a wrinkle drying coating composition comprising conjugated double bonded oil and butadiene-acrylonitrile copolymer rubber latex in proportions of 100 parts by weight of said oil to from 10 to 50 parts by weight of latex, said latex having a solids content of 51.6 per cent.*

*11. As a new composition of matter, a wrinkle drying coating composition comprising conjugated double bonded oil and polychloroprene latex in proportions of 100 parts by weight of said oil to from 10 to 50 parts by weight of latex, said latex having a solids content of 50 per cent.*

*12. The method of making a wrinkle drying coating composition which comprises admixing conjugated double bonded oil with butadiene-styrene copolymer rubber latex in proportions of from 10 to 50 parts by weight of latex to 100 parts by weight of said oil, said latex having a solids content of 56 percent, adding thereto approximately 40 to 80 parts by weight of a pigment paste comprising two-thirds pigment and one-third conjugated double bonded oil by weight, and adding to the resulting mixture solvent in quantity sufficient to obtain a predetermined viscosity.*

*13. The method of making a wrinkle drying coating composition which comprises admixing conjugated double bonded oil with butadiene-acrylonitrile copolymer rubber latex in proportions of from 10 to 50 parts by weight of latex to 100 parts by weight of said oil, said latex having a solids content of 51.6 per cent, adding thereto approximately 40 to 80 parts by weight of a pigment paste comprising two-thirds pigment and one-third conjugated double bonded oil by weight, and adding to the resulting mixture solvent in quantity sufficient to obtain a predetermined viscosity.*

*14. The method of making a wrinkle drying coating composition which comprises admixing conjugated double bonded oil with polychloroprene latex in proportions of from 10 to 50 parts by weight of latex to 100 parts by weight of said oil, said latex having a solids content of 50 per cent, adding thereto approximately 40 to 80 parts by weight of a pigment paste comprising two-thirds pigment and one-third conjugated double bonded oil by weight, and adding to the resulting mixture solvent in quantity sufficient to obtain a predetermined viscosity.*

*15. As a new composition of matter, a wrinkle drying coating composition consisting of a conjugated double bonded oil and synthetic rubber latex in proportions of 100 parts by weight of said oil to from 10 to 50 parts by weight of latex, said latex having a solids content of from 50 to 65 per cent and said rubber being a butadiene derivative selected from the group consisting of butadiene styrene copolymer, butadiene - acrylonitrile copolymer and polychloroprene.*

*16. The method of making a wrinkle drying coating composition which consists in admixing conjugated double bonded oil with synthetic rubber latex in proportions of from 10 to 50 parts by weight of latex to 100 parts by weight of said oil, said latex having a solids content of from 50 to 65 per cent and said rubber being a butadiene derivative selected from the group consisting of butadiene-styrene copolymer, butadiene-acrylonitrile copolymer and polychloroprene, adding thereto approximately 40 to 50 parts by weight of pigment paste comprising two-thirds pigment and one-third conjugated double bonded oil by weight, and adding to the resulting mixture solvent in quantity sufficient to obtain a predetermined viscosity.*

NATHAN T. BEYNON.

REFERENCES CITED

The following references are of record in the file of this patent:

UNITED STATES PATENTS

| Number | Name | Date |
|---|---|---|
| 1,883,408 | Root | Oct. 18, 1932 |
| 1,891,079 | Chittick | Dec. 13, 1932 |
| 2,078,172 | Abrams et al. | Apr. 20, 1937 |
| 2,305,613 | Stillwell | Sept. 15, 1942 |
| 2,468,989 | Luaces | May 3, 1949 |